United States Patent
Bainbridge et al.

(10) Patent No.: US 8,126,332 B2
(45) Date of Patent: Feb. 28, 2012

(54) METHOD OF WAVELENGTH ALIGNMENT FOR A WAVELENGTH DIVISION MULTIPLEXED PASSIVE OPTICAL NETWORK

(75) Inventors: John Bainbridge, Ottawa (CA); Tom Luk, Ottawa (CA); Bin Cao, Kanata (CA)

(73) Assignee: LG-Ericsson Co., Ltd., Seoul (KR)

( * ) Notice: Subject to any disclaimer, the term of this patent is extended or adjusted under 35 U.S.C. 154(b) by 788 days.

(21) Appl. No.: 12/194,912

(22) Filed: Aug. 20, 2008

(65) Prior Publication Data

US 2010/0046949 A1 Feb. 25, 2010

(51) Int. Cl.
*H04J 14/02* (2006.01)
(52) U.S. Cl. ........... 398/95; 398/32; 398/72; 398/79; 398/33; 398/34; 398/38; 398/169; 398/196; 398/197; 372/32; 372/34; 372/38.02; 372/64; 372/50.1
(58) Field of Classification Search .......... 398/68, 398/69, 70, 71, 72, 79, 95, 183, 186, 192, 398/193, 195, 194, 196, 197, 198, 200, 201, 398/202, 208, 209, 210, 30, 31, 32, 33, 34, 398/38, 169, 171, 165, 168, 98, 99, 100; 372/32, 34, 36, 38.02, 71, 81, 92, 64, 50.1
See application file for complete search history.

(56) References Cited

U.S. PATENT DOCUMENTS

| | | | |
|---|---|---|---|
| 7,254,340 B2 | 8/2007 | Jung et al. | |
| 7,327,771 B2 | 2/2008 | Kim et al. | |
| 2006/0045542 A1* | 3/2006 | Lee et al. | 398/195 |
| 2007/0154216 A1 | 7/2007 | Kim et al. | |
| 2008/0008473 A1* | 1/2008 | Kim et al. | 398/68 |

OTHER PUBLICATIONS

Kim et al, "Laser Spectral Envelope Control Using a Double Contact Fabry-Perot Laser Diode for WDM-PON", Photonics Technology Letters IEEE, Oct. 2006, pp. 2132-2134, vol. 18 issue 20.
Kim et al., "A Low-Cost WDM Source with an ASE Injected Fabry-Perot Semiconductor Laser", Photonics Technology Letters IEEE, Aug. 2000, pp. 1067-1069, vol. 12 issue 8.
Shin et al., "Low-Cost WDM-PON with Colorless Bidirectional Transceivers", Journal of Lightwave Technology, Jan. 2006, pp. 158-165, vol. 24 issue 1.

* cited by examiner

*Primary Examiner* — Hanh Phan
(74) *Attorney, Agent, or Firm* — KED & Associates LLP

(57) ABSTRACT

Described is a method for controlling the wavelength of a laser in a wavelength division multiplexed (WDM) system. The method includes generating broadband light having a dithered optical power and a wavelength spectrum that includes a plurality of WDM wavelengths. The broadband light is spectrally filtered to generate a spectrally-sliced optical signal having a wavelength spectrum that includes one of the WDM wavelengths. The spectrally-sliced optical signal is injected into a laser and a dithered optical power of the laser is determined. A parameter of the laser is controlled in response to the determination of the dithered optical power to thereby align a wavelength of the laser to the wavelength spectrum of the spectrally-sliced optical signal.

41 Claims, 9 Drawing Sheets

METHOD OF WAVELENGTH ALIGNMENT FOR A WAVELENGTH DIVISION MULTIPLEXED PASSIVE OPTICAL NETWORK

FIELD OF THE INVENTION

The invention relates generally to optical communications networks. More particularly, the invention relates to a method for controlling a laser wavelength in an optical transmitter in a wavelength division multiplexed passive optical network.

BACKGROUND OF THE INVENTION

A passive optical network (PON) is a point-to-multipoint optical network that provides significantly greater bandwidth in an access network compared to traditional copper-based networks. Generally, a PON includes only passive components, i.e., components that do not require electrical power for operation. Repeaters, relays, processors and memory modules are typically absent. A PON generally includes an optical line termination (OLT) located in a central office (CO) or local exchange. The OLT is coupled to optical network units (ONUs), or subscriber terminals, in the field through an optical fiber. An ONU provides any necessary optical to electrical (O-E) and electrical to optical (E-O) conversion between the fiber and the copper wires that reach homes and offices in a fiber to the neighborhood (FTTN) or fiber to the curb (FTTC) implementation. In other instances, the OLT is coupled directly to an optical network terminal (ONT) such as in a fiber to the premises (FTTP) or fiber to the home (FTTH) implementation.

The OLT transmits an optical signal at a single wavelength "downstream" over an optical fiber between the OLT and the ONU (or OLTs). The ONU (or ONT) transmits an optical signal in the reverse direction, that is, "upstream" through the optical fiber at a different wavelength than the downstream optical signal. For OLTs, the downstream and upstream optical signals transmitted through the optical fiber are time-division multiplexed signals that include the individual signals for all the end users.

With an increasing consumer demand for bandwidth, wavelength division multiplexing ("WDM") PONs have gained acceptance in the telecommunications industry. WDM PONs support substantially greater bandwidth than conventional PONs and offer the additional benefits of network security and upgradeability. Unlike standard PONs where the bandwidth available at a single wavelength is shared amongst all end users, a WDM PON system employs multiple optical transmitters where each optical transmitter transmits on a different wavelength.

Initially, the device costs for critical components of WDM PONs slowed their integration into telecommunications networks. In particular, the cost of wavelength-specific optical transmitters presented an obstacle to widespread implementation of WDM PONs. More recently WDM PONs using less expensive multi-wavelength (i.e., "colorless") optical transmitters such as those described in Kim, Hyun Deok et al., "A Low-Cost WDM Source with an ASE Injected Fabry-Perot Semiconductor Laser," IEEE Photonics Technology Letters, Vol. 12, No. 8, August 2000 and in Shin, Dong Jae et al., "Low-Cost WDM-PON with Colorless Bidirectional Transceivers," Journal of Lightwave Technology, Vol. 24, No. 1, January 2006 have been used. This type of WDM PON employs a broadband seeding source that is spectrally-sliced. The light in each spectral slice is used to seed a respective one of the optical transmitter lasers to lock it to a unique WDM wavelength.

The efficiency of the colorless optical transmitters can limit the overall system performance. In particular, if the wavelength of the cavity mode of a transmitter laser is not properly aligned with respect to the wavelength corresponding to the peak optical power in the spectral slice used to seed the laser, the optical power in other cavity modes is increased with a corresponding decrease in the optical power of the primary transmitted mode. Environmental effects such as a change in temperature can cause or change a difference between the wavelength of the transmitted cavity mode and the peak of the spectral slice. In some instances the spectral slice may injection lock two cavity modes of the laser or result in mode hopping which can result in instability of the optical power output. If the spectrum of the optical signal generated by the transmitter laser is broadened due to significant optical power shifted to other cavity modes, the optical signal may be significantly attenuated by an arrayed waveguide grating (AWG) or other WDM multiplexing device.

The present invention addresses the problems set forth above and provides a convenient and cost-effective solution.

SUMMARY OF THE INVENTION

In one aspect, the invention features a method for controlling the wavelength of a laser in a WDM system. The method includes generating broadband light having a dithered optical power and a wavelength spectrum that includes a plurality of WDM wavelengths. The broadband light is spectrally filtered to generate a spectrally-sliced optical signal having a wavelength spectrum that includes one of the WDM wavelengths. The spectrally-sliced optical signal is injected into a laser and a dithered optical power of the laser is determined. A parameter of the laser is controlled in response to the determination of the dithered optical power to thereby align a wavelength of the laser to the wavelength spectrum of the spectrally-sliced optical signal.

In another aspect, the invention features a WDM system that includes a broadband light source, a demultiplexer, a laser and a control module. The broadband light source generates broadband light having a dithered optical power and a wavelength spectrum that includes a plurality of WDM wavelengths. The demultiplexer is in optical communication with the broadband light source and generates a spectrally-sliced optical signal having a wavelength spectrum that includes a WDM wavelength. The laser is in communication with the demultiplexer to receive the spectrally-sliced optical signal. The laser generates a WDM signal having a wavelength in the wavelength spectrum of the spectrally-sliced optical signal. The control module is in communication with the laser and determines a dithered optical power of the laser. The control module generates a control signal to adjust a parameter of the laser to thereby align the wavelength of the WDM signal to the wavelength spectrum of the spectrally-sliced optical signal.

In yet another aspect, the invention features a method for controlling the wavelength of a laser in a WDM system. The method includes spectrally filtering broadband light to generate a spectrally-sliced optical signal having a wavelength spectrum that includes a WDM wavelength. The spectrally-sliced optical signal is injected into a laser having a plurality of cavity modes wherein each cavity mode has a wavelength. A value of a parameter of the laser is changed from a first value to a second value to cause a change in the wavelengths of the cavity modes of the laser and an average optical power of the laser at the second value of the parameter is determined. The value of the parameter is maintained at the second value if the determination of the average optical power indicates an increase wherein the alignment of a wavelength of a cavity mode to the wavelength spectrum of the spectrally-sliced optical signal is improved. The value of the parameter is changed to the first value if the determination of the average optical power does not indicate an increase.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview, the invention relates to a method for controlling the wavelength of a laser in a WDM system. The method includes generating broadband light having a dithered optical power and a wavelength spectrum that includes multiple WDM wavelengths. The broadband light is spectrally filtered to generate a spectrally-sliced optical signal having a wavelength spectrum that includes one of the WDM wavelengths. The spectrally-sliced optical signal is injected into a laser, such as a Fabry-Perot laser, and a dithered optical power of the laser is determined. The method provides for control of a parameter of the laser in response to the detected dithered optical power. Control of the parameter enables alignment of a wavelength of the laser to the wavelength spectrum of the spectrally-sliced optical signal.

Although the present teachings are described in conjunction with various embodiments and examples, it is not intended that the present teachings be limited to such embodiments. On the contrary, the present teachings contemplate various modifications, alternatives and equivalents as can be appreciated by one of skill in the art.

The present invention provides a variety of advantages which will be appreciated in light of the present teachings, including improvement in optical link budgets, extended reach relative to conventional WDM PON systems and suppression of bi-modal lasing behavior of optical transmitters. Another advantage is the reduction or minimization of the range of variation in the output power of WDM optical transmitters over an operating temperature range, over a range of wavelengths in a spectral slice and over the operating life of the WDM PON system.

Figure 1:
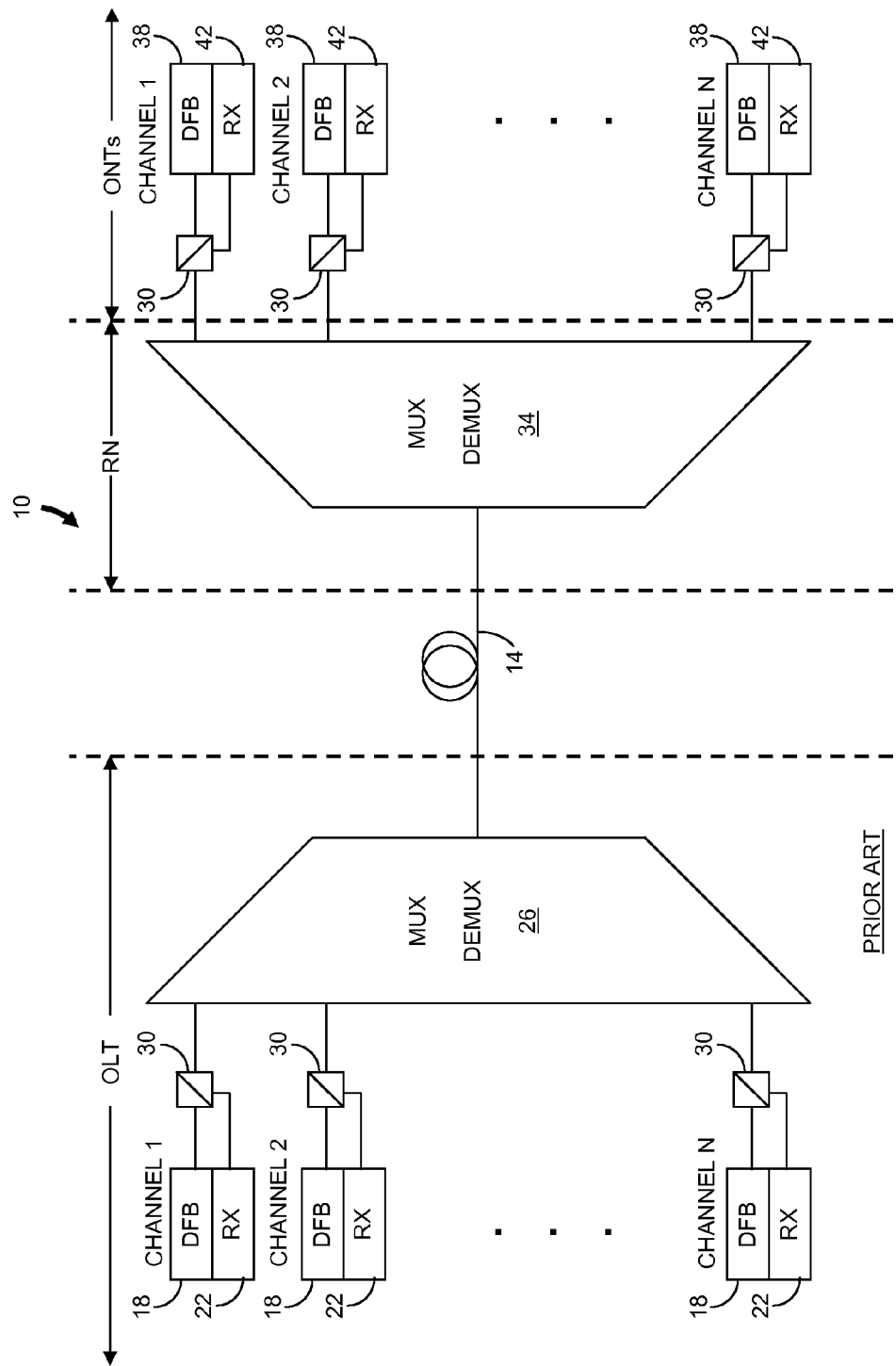
FIG. 1 is a high-level block diagram of a WDM PON as known in the art.

FIG. 1 shows a high-level block diagram of a WDM PON 10 as known in the art. The WDM PON 10 includes an optical line termination OLT which is often located at a central office, optical network terminals ONTs (e.g., "subscriber terminals"), and a remote node RN which is typically located at one end of a WDM communications path 14 nearer to the ONTs. The illustrated OLT includes wavelength-specific optical transmitters 18 such as distributed feedback (DFB) lasers that transmit WDM signals in a first wavelength band (e.g., L-band, C-band, S-band or E-band) to the ONTs, receivers RX 22 that receive WDM signals from the ONTs and an optical multiplexer/demultiplexer MUX/DEMUX 26. An optical band splitter 30 is disposed between the optical multiplexer/demultiplexer 26 and each pair of optical transmitters 18 and receivers 22. Each optical band splitter 30 couples a WDM signal in the first wavelength band from one of the optical transmitters 18 to the multiplexer 26 and couples WDM signals in a second wavelength band transmitted from the ONTs through the demultiplexer 26 to the OLT receivers 22. The first and second wavelength bands include different wavelength ranges. For example, the first wavelength band can be L-band and the second wavelength band can be C-band.

The remote node RN includes a multiplexer/demultiplexer MUX/DEMUX 34 disposed between the subscriber end of the WDM communications path 14 and the ONTs. The multiplexer/demultiplexers 26 and 34 can be AWGs or other devices or components such thin-film dielectric filters that multiplex and demultiplex the WDM channels.

Each ONT includes a wavelength-specific optical transmitter 38 such as a DFB laser to transmit WDM signals in the second wavelength band to the OLT receivers 22. Each ONT also includes a receiver RX 42 to receive the WDM signal transmitted from a respective one of the OLT optical transmitters 18. An optical band splitter 30 is disposed between the multiplexer/demultiplexer 34 and each pair of optical transmitters 38 and receivers 42. Each optical band splitter 30 couples a WDM signal in the second wavelength band from one of the optical transmitters 38 to the multiplexer 34 and couples WDM signals in the first wavelength band transmitted from the OLT through the demultiplexer 34 to the ONT receivers 42.

Each wavelength-specific optical transmitter 18 and 38 is fabricated specifically for operation at a predefined WDM wavelength. Thus one disadvantage of the illustrated WDM PON 10 is the cost of the optical transmitters 18 and 38.

Figure 2:
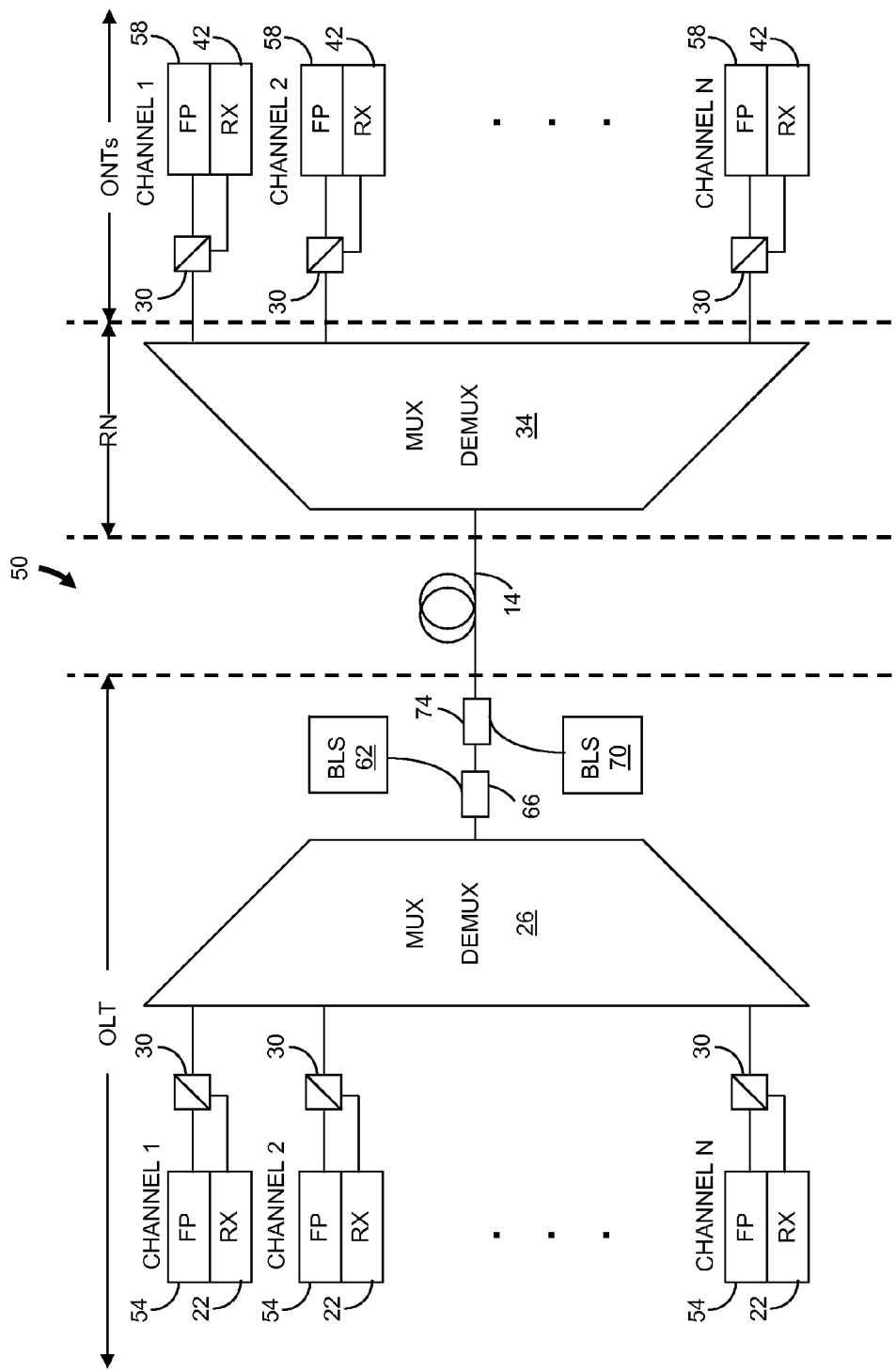
FIG. 2 illustrates a WDM PON using Fabry-Perot lasers that are injection locked by broadband light sources.
Figure 3:
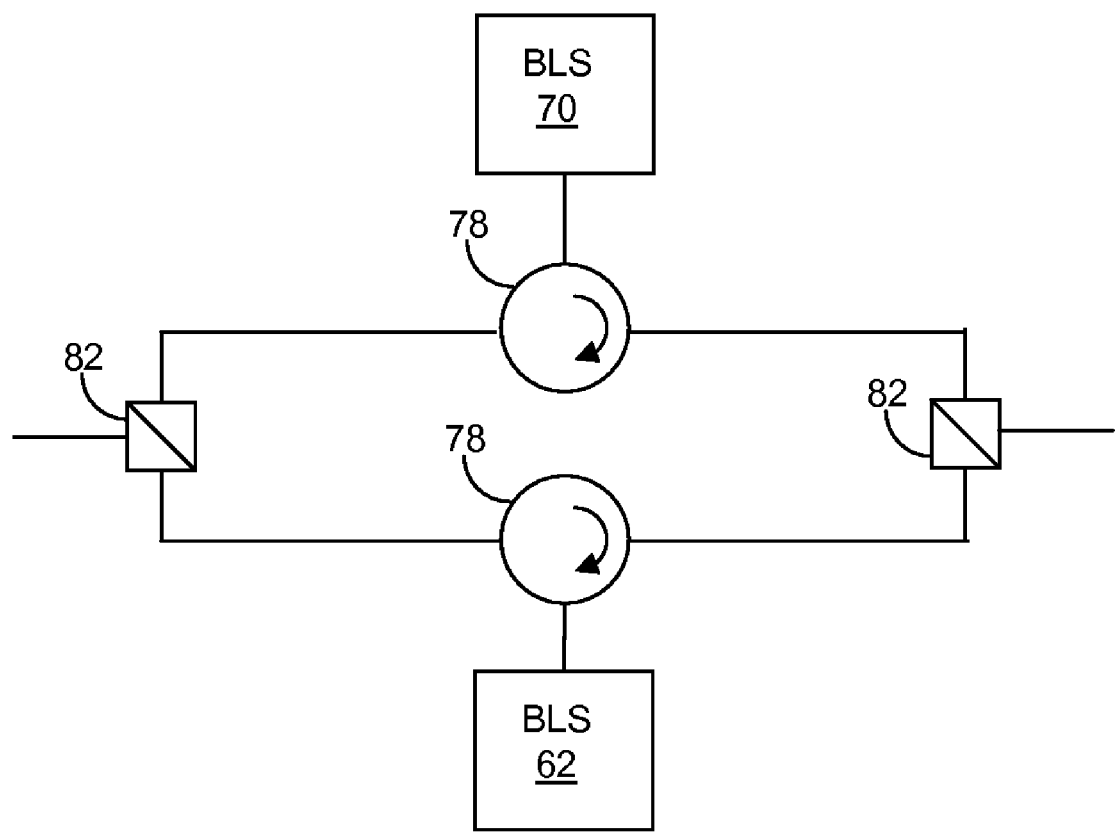
FIG. 3 illustrates an embodiment of an optical coupler that can be used with the WDM PON of FIG. 2.

An alternative WDM PON configuration 50 is shown in FIG. 2. The WDM PON 50 includes Fabry-Perot (FP) lasers 54 and 58. Each FP laser 54 and 58 emits light at multiple discrete wavelengths. The illustrated WDM PON 50 also includes an upstream broadband light source BLS 62 coupled to the communications path 14 through an optical coupler 66. Similarly, a downstream broadband light source BLS 70 is coupled to the communications path 14 through another optical coupler 74. The optical couplers 66 and 74 can be optical circulators or other optical coupling devices as are known in the art. In a preferred embodiment, the optical couplers 66 and 74 are configured as optical circulators 78 and optical band splitters 82 as shown in FIG. 3 to couple the broadband light sources 62 and 70 to the communications path 14.

Figure 4A:
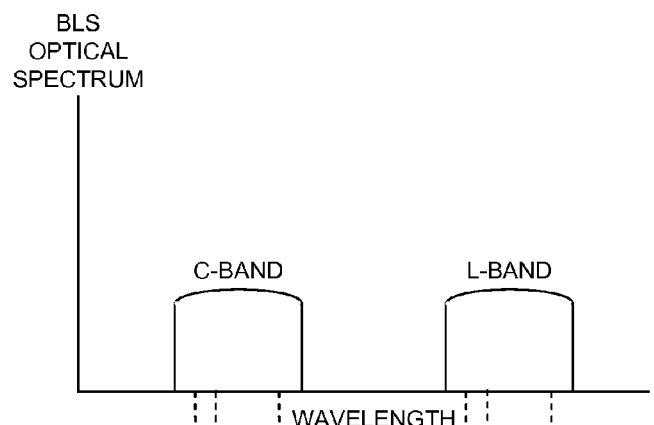
FIG. 4A depicts the wavelength spectra for the two broadband light sources of FIG. 2.
Figure 4B:
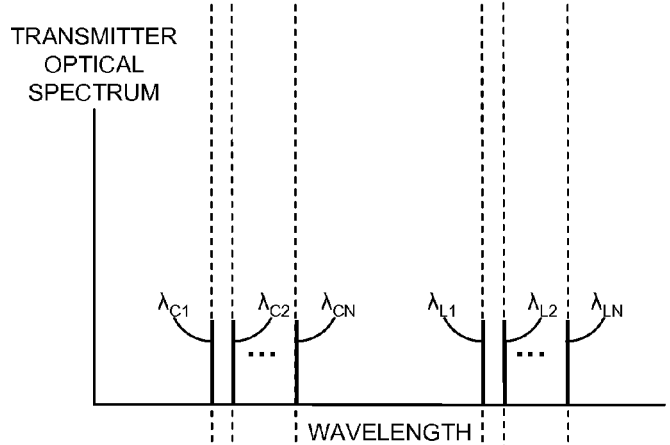
FIG. 4B depicts the wavelength spectra for the Fabry-Perot lasers of FIG. 2.

The broadband light sources 62 and 70 generally include an amplified spontaneous emission device such as an erbium doped fiber amplifier or a superluminescent light emitting diode to generate a broadband optical signal having high optical power across a wide spectral range that includes the respective wavelength band. The wavelength spectra for the two broadband light sources 62 and 70 and the FP lasers 54 and 58 are shown in FIG. 4A and FIG. 4B, respectively, where the figures share a common wavelength axis. The light from each broadband light source 62 or 70 lies within a single wavelength band, such as L-band, C-band, S-band or E-band. As illustrated, the lower wavelength band is C-band and the upper wavelength band is L-band. Only three WDM wavelengths $\lambda_{C1}$, $\lambda_{C2}$ and $\lambda_{CN}$, and $\lambda_{L1}$, $\lambda_{L2}$ and $\lambda_{LN}$ are shown in each band for clarity. The number N of WDM wavelengths in each band is generally substantially greater (e.g., N=32).

Figure 4C:
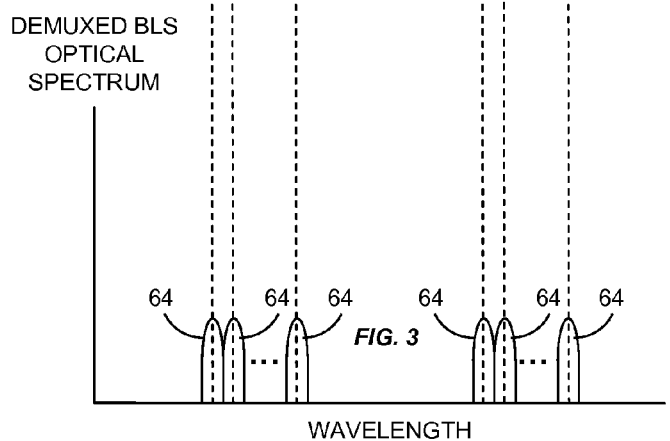
FIG. 4C depicts the spectral slices provided by the demultiplexers of FIG. 2 that are used to lock the wavelengths of the Fabry-Perot lasers.

Referring again to FIG. 2, broadband light emitted by the upstream broadband light source 62 is combined through the coupler 66 with the WDM signals propagating from the ONTs. The demultiplexer 26 separates these WDM signals and provides a single WDM signal to each OLT receiver 22. The demultiplexer 26 also spectrally filters the broadband light from the upstream broadband light source 62 into spectral slices 64 as shown in FIG. 4C. The vertical dashed lines common to FIGS. 4A, 4B and 4C depict the ideal correspondence between the wavelengths for the power spectral densities. The spectrally-sliced optical signals 64 are used to "seed" the OLT transmitters 54. That is, light in each spectral slice 64 is provided to a respective one of the FP lasers 54 to lock the laser 54 to a unique one of the WDM wavelengths in the first wavelength band.

In a similar manner, the broadband light emitted by the downstream broadband light source 70 is combined through the coupler 74 with the WDM signals propagating from the OLT. The demultiplexer 34 separates these WDM signals and provides a single WDM signal to each ONT receiver 42. The demultiplexer 34 also spectrally filters the broadband light from the downstream broadband source 70 (as shown in FIG. 4C) and the spectrally-sliced optical signals 64 are injected into the FP lasers 58 of the ONTs.

The broadband light sources 62 and 70 enable the replacement of the wavelength-specific optical transmitters of FIG. 1 with less expensive "colorless" optical transmitters such as the illustrated FP lasers 54 and 58 that can be locked to the respective WDM wavelengths. A FP laser typically has many lasing modes (wavelengths) as determined by the length of the laser cavity. The FP laser can operate on a limited number of modes with other modes suppressed if sufficient optical power is provided in a wavelength range that does not include all cavity modes. If the bandwidth of the spectral slice 64 is sufficiently small so that only one mode is included, the multi-mode FP laser operates as a single mode laser at the included WDM wavelength.

Figure 5A:
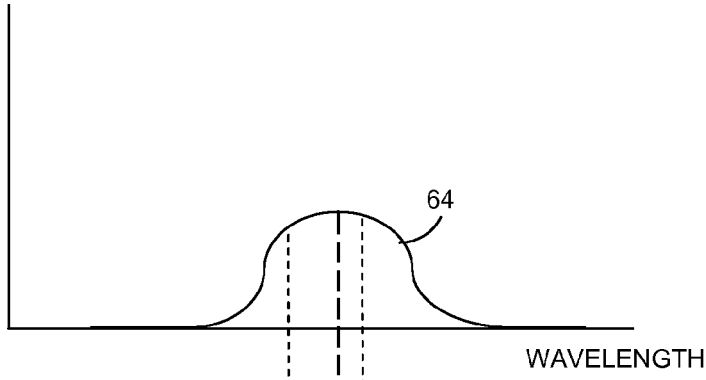
FIG. 5A illustrates a spectral slice that is used to injection lock a single Fabry-Perot laser to a desired wavelength.
Figure 5B:
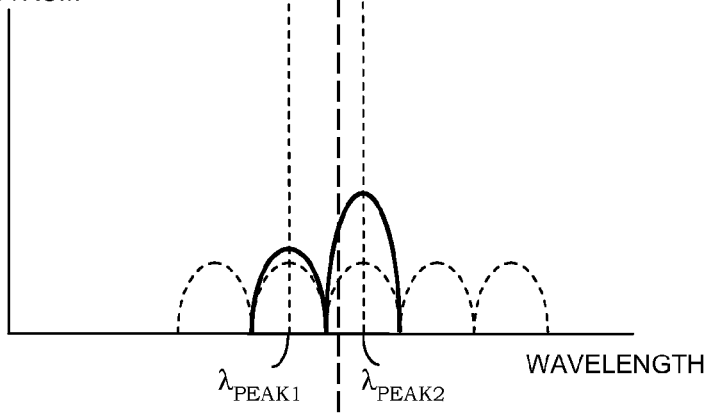
FIG. 5B illustrates an example of how the cavity modes of a Fabry-Perot laser may be misaligned with respect to the spectral slice of FIG. 5A.
Figure 5C:
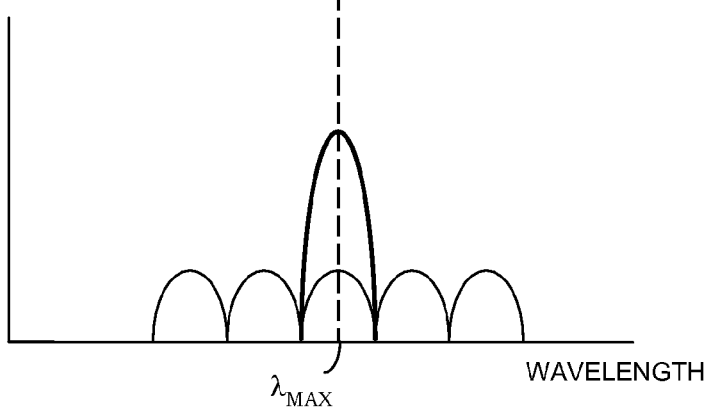
FIG. 5C illustrates accurate alignment of a cavity mode of a Fabry-Perot laser with respect to the spectral slice of FIG. 5A.

The optical signal power generated by the FP laser depends on the alignment of the cavity modes with respect to the injected spectral slice 64 as shown in FIG. 5A to FIG. 5C where the figures shares a common horizontal wavelength axis. FIG. 5A show a spectral slice 64 that is used to injection lock a FP laser to a desired wavelength. FIG. 5B shows an example of how the gain peaks of the FP laser cavity modes are distributed in wavelength. The dashed curves indicate the cavity modes without injection locking and the two bolded curves indicate the two cavity modes that include most of the optical power emitted from the FP laser when injection locking is implemented. The dashed vertical lines indicate the wavelengths $\lambda_{PEAK1}$ and $\lambda_{PEAK2}$ of the two locked cavity modes. The cavity mode at wavelength $\lambda_{PEAK2}$ includes the most optical power as it is closest to the peak wavelength $\lambda_{MAX}$ of the spectral slice 64 although significant optical power is present in the cavity mode at wavelength $\lambda_{PEAK1}$. Thus two FP laser modes are effectively injection locked. In this situation the optical signal power of the FP laser is substantially attenuated by the corresponding multiplexer 26 or 34 which has a peak transmission that is offset in wavelength from the cavity mode wavelengths $\lambda_{PEAK1}$ and $\lambda_{PEAK2}$.

FIG. 5C shows that single mode operation occurs when the wavelengths of the FP cavity modes are shifted such that one of the cavity modes is accurately aligned with the peak wavelength $\lambda_{MAX}$ of the spectral slice 64. Generally the peak wavelength $\lambda_{MAX}$ corresponds to the maximum transmission for a WDM channel through the multiplexer 26 or 34 thus the illustrated alignment results in the best performance for the WDM channel.

Figure 6:
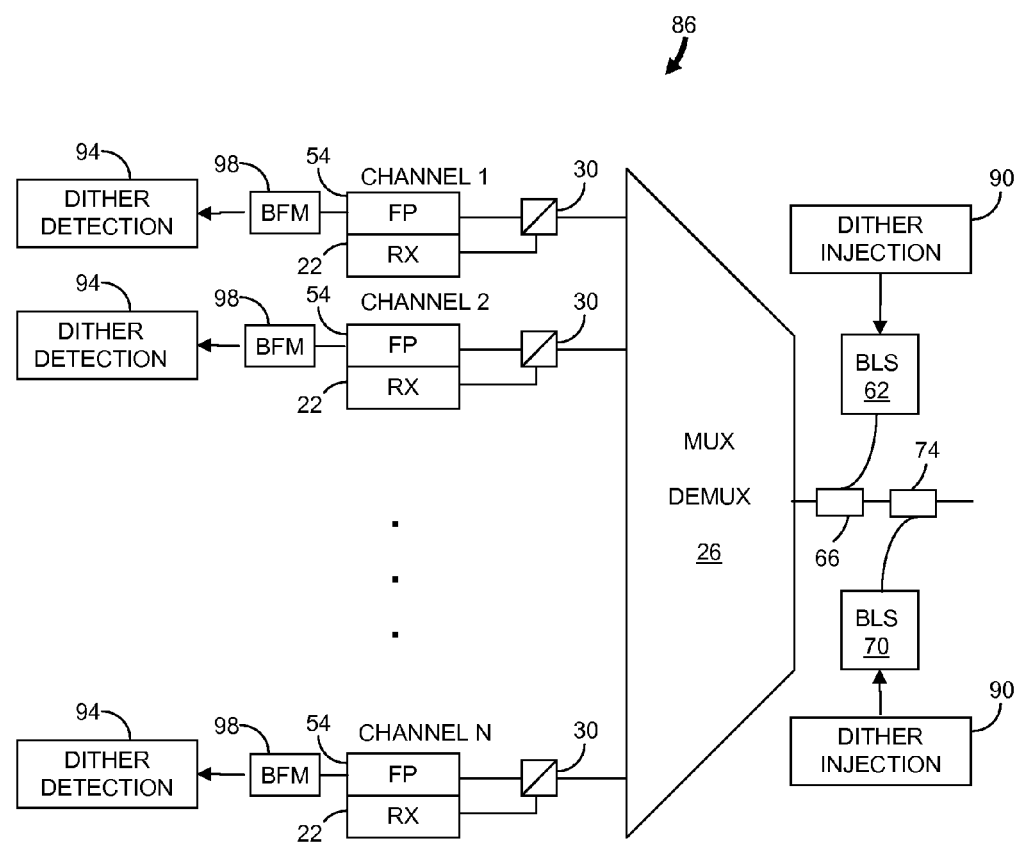
FIG. 6 illustrates an OLT for an embodiment of a WDM PON according to the invention.

FIG. 6 illustrates an OLT 86 for an embodiment of a WDM PON according to the invention. The OLT 86 enables accurate alignment of the wavelength of the FP cavity modes of the FP lasers 54 in the OLT to the spectrally-sliced optical signals from the multiplexer/demultiplexer 26. In addition to components similar to those for the OLT of FIG. 2, the illustrated OLT 86 also includes a dither injection module 90 for each broadband light source 62 and 70 and a dither detection module 94 for each FP laser 54. A back facet monitor BFM 98 integrated to each FP laser 54 generates a signal (e.g., a photocurrent) corresponding to the optical power of the FP laser 54 and communicates this signal to the respective dither detection module 94. Although not illustrated, it will be recognized that the wavelengths of the FP cavity modes of the FP lasers in the ONTs can similarly be accurately aligned to the spectrally-sliced optical signals from the multiplexer/demultiplexer 34 at the remote node using back facet monitors 98 and dither detection modules 94.

Figure 7:
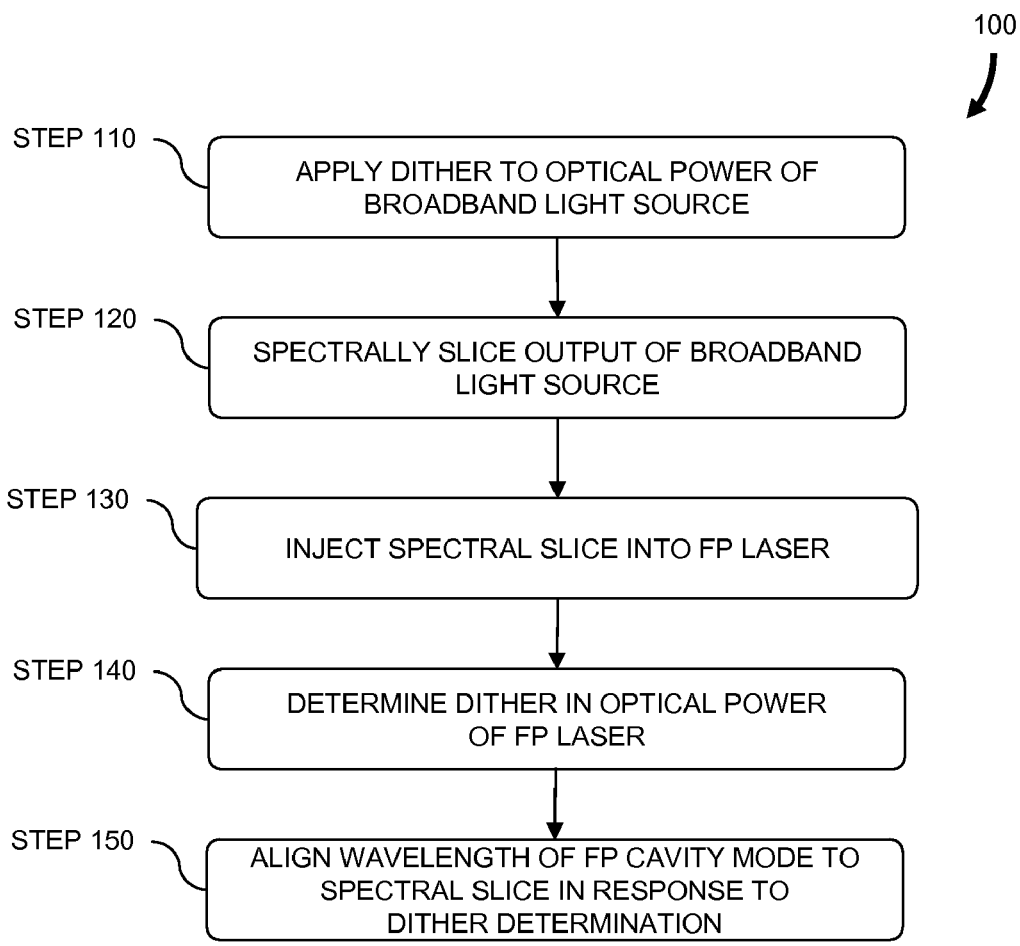
FIG. 7 is a flowchart representation of an embodiment of a method for controlling the wavelength of a laser in a WDM system according to the invention.

Referring also to FIG. 7, a flowchart representation of an embodiment of a method for controlling the wavelength of a laser in a WDM system according to the invention is shown. The following description of the method 100 is directed to a FP laser 54 in the OLT 86 of FIG. 6; however, it should be recognized that the method 100 can be used in a similar manner to control the operation of an FP laser in an ONT.

A dither signal is applied (step 110) to the broadband light source 62 to cause a modulation (i.e., dithering) of the optical power of the broadband light. The amplitude of the dithered optical power is substantially less than the total optical output power (e.g., less than 10%) and its frequency is substantially less than the bit rate for a WDM channel so that it can be filtered out to avoid "contamination" of the communications data. As an example for a 1 Gbps WDM channel rate, the dither amplitude can be 4% of the broadband light source optical power and the dither frequency can be in the range between 50 Hz to 1 MHz as accommodated by an inexpensive digital signal processor or microcontroller.

The dithering of the optical power of the broadband light can be achieved in a variety of ways. In one embodiment in which the broadband light source 62 is constructed with an Erbium-doped fiber amplifier, a dither is applied to the bias current of the pump lasers. In an alternative embodiment in which the broadband light source 62 is a light-emitting diode (LED), the dither is applied as a direct modulation of the LED bias current. Alternatively, a dither control signal can be applied to a variable optical attenuator disposed between the broadband light source 62 and the communications path 14. In yet another embodiment, the broadband light source 62 can be constructed to include a plurality of laser sources each operating on a unique wavelength such that the wavelength spectrum of the broadband light source is a "wavelength comb" as opposed to a continuous wavelength distribution. In this embodiment, the magnitude of the current supplied to each laser is dithered. Still other techniques for modulating the output optical power of the broadband light source 62 to achieve the desired dithered optical power will be apparent to those of skill in the art.

The optical power of the broadband light source 62 is spectrally-sliced (step 120) and injected (step 130) into one of the FP lasers 54 as described above to lock to a single cavity mode. The back facet monitor 98 provides a signal (e.g., photocurrent) indicative of the optical output power of the FP laser 54 to the dither detection module 94. The dither detection module 94 determines (step 140) the amplitude of the dither in the received signal. Detection of the dither component is accomplished, for example, by sampling the photocurrent with a digital signal processor or microcontroller. The sampled signal is processed to determine its amplitude and to determine a maximum dither amplitude. The amplitude of the dithered signal can be used as a measure of the difference between the wavelength of a dominant cavity mode and the peak wavelength $\lambda_{MAX}$ of the spectral slice. The amplitude is generally greatest when a single cavity mode of the FP laser 54 is aligned with the peak of the spectral slice.

In a preferred embodiment, a pseudorandom bit sequence is used to dither the optical power of the broadband light. The bit sequence is provided to the dither detection module 94 so that the detected signal can be correlated with the expected bit sequence, thereby enabling extraction of the dither signal in a noisy environment.

To establish and maintain the dither amplitude at the maximum value, a control loop is utilized to control (step 150) a parameter of the FP laser so that that one of the cavity modes is optimally aligned to the spectral slice. For example, the control loop may be a thermoelectric control loop in which a control signal is generated to change the temperature of the FP laser so that a wavelength of the FP cavity mode is properly aligned with the spectral slice. In some implementations significant power requirements may make thermoelectric control impractical. Other techniques known in the art can also be used to control an appropriate parameter of the laser, such as mechanical control where the controlled parameter is the cavity length of an external cavity laser. The cavity length can be adjusted according to a control signal by using a movable micro electro-mechanical system (MEMS) mirror or by other known techniques. Electro-optic control techniques can also be employed to control a laser parameter. For example, a double contact laser such as that described in Kim, Ah-Hyun et al., "Laser Spectral Envelope Control Using a Double Contact Fabry-Perot Laser Diode for WDM-PON," IEEE Photonics Technology Letters, Vol. 18, No. 20, Oct. 15, 2006 can be used as a more compact and less costly choice when compared to a conventional thermally-controlled FP laser.

The method 100 can be implemented using a control module that includes at least the dither detection module 94 and in some embodiments also includes the dither injection module 90. The control module includes an inexpensive, commercially-available digital signal processor or microcontroller to control an appropriate parameter of the FP laser 54 and thereby maximize the detected dither amplitude. The control module is located in the network where electrical power is readily available. Advantageously, the signal processing performed by the control module eliminates the need for complex and expensive optical components and devices which often have high failure rates.

Figure 8:
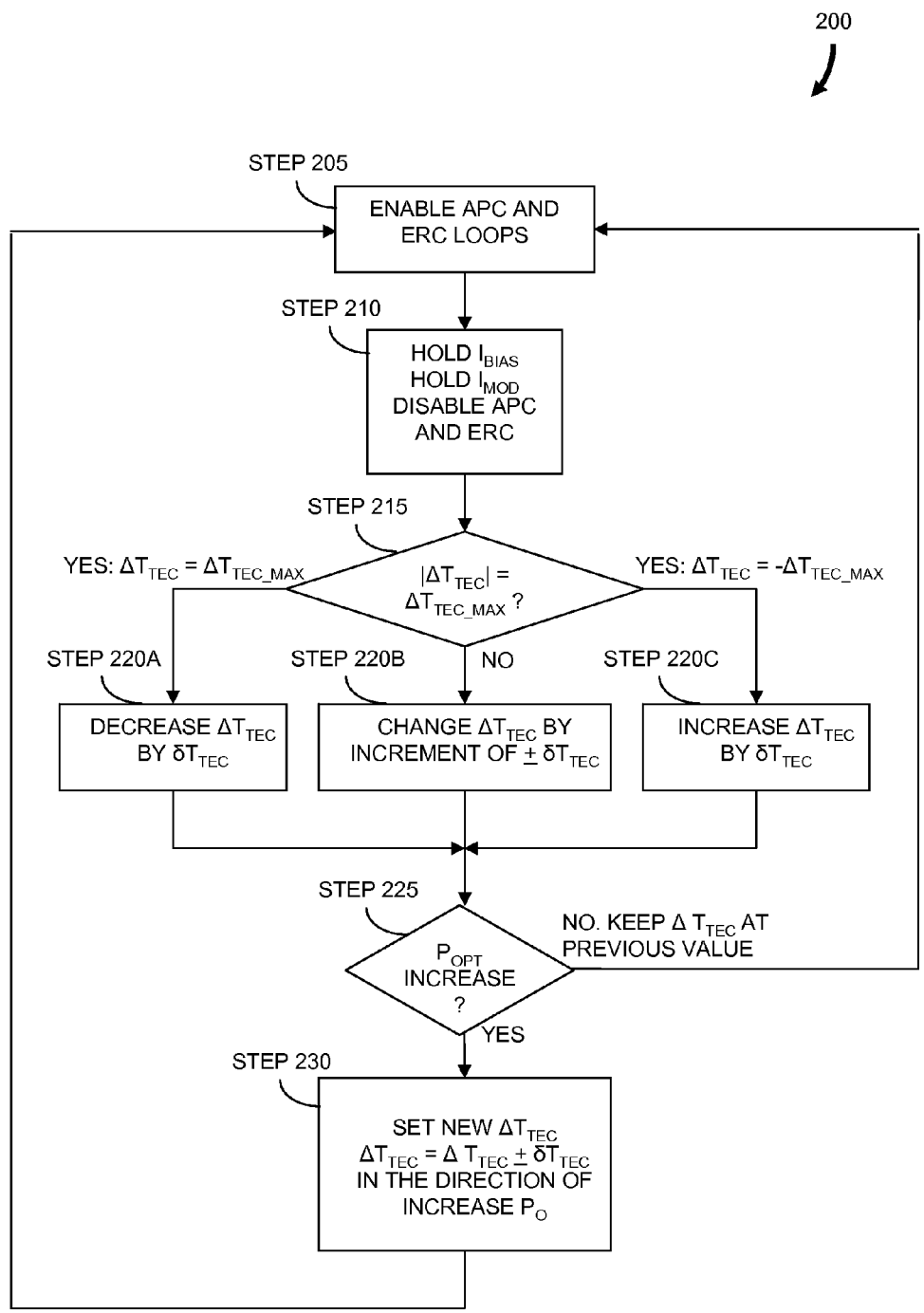
FIG. 8 is a flowchart representation of another embodiment of a method for controlling the wavelength of a laser in a WDM system according to the invention.
Figure 9:
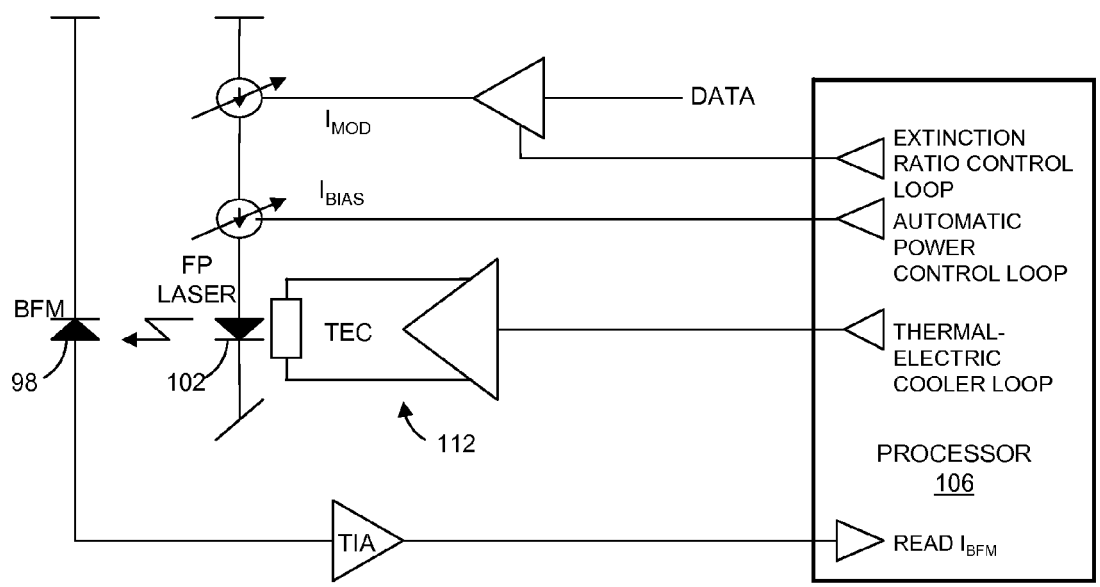
FIG. 9 is a block diagram of a Fabry-Perot laser and control system that can be operated according to the method of FIG. 8.

FIG. 8 is a flowchart representation of an embodiment of a method for controlling the wavelength of a laser in a WDM system according to the invention. The method 200 is based on monitoring an average optical output power of an injection-locked laser to control the wavelength of the laser relative to the injected spectral slice. FIG. 9 is a block diagram of a FP laser 102 and control system that can be operated according to the method 200. The control system includes a processor 106 that is used to control various laser operating parameters and a thermoelectric cooler TEC 112 to establish and maintain alignment of the cavity modes of the FP laser 102 with respect to the injected spectral slice from a broadband light source as described below. The processor 106 preferably includes a digital signal processor or a microcontroller, one or more analog to digital converters and one or more digital to analog converters.

Initially, the automatic power control (APC) and extinction ratio control (ERC) loops are enabled (step 205) and the laser bias current $I_{BIAS}$ and laser modulation current $I_{MOD}$ are established at an initial temperature $\Delta T_{TEC}$ of the FP laser 102 as established and maintained by the thermoelectric cooler 112. Next, the bias current $I_{BIAS}$ and modulation current $I_{MOD}$ are held constant while the APC and ERC control loops are disabled (step 210). If the temperature $\Delta T_{TEC}$ of the FP laser 54 with the APC and ERC control loops disabled is determined (step 215) to be between a minimum and maximum allowable temperature ($-\Delta T_{TEC\_MAX}$ and $\Delta T_{TEC\_MAX}$, respectively), the temperature $\Delta T_{TEC}$ is changed (step 220B) from its first value by $+\delta T_{TEC}$ or $-\delta T_{TEC}$ (a second value) and the average optical power $P_{OPT}$ of the FP laser 54 after the change is determined (step 225) using the photocurrent $I_{BFM}$ provided by the back facet monitor 98. If the average optical power $P_{OPT}$ is observed to increase relative to a previously determined value, indicating that the alignment of the wavelength of the FP laser 54 to the spectral slice has improved, the temperature $\Delta T_{TEC}$ is increased or decreased (step 230) by the appropriate differential value $\delta T_{TEC}$ or $-\delta T_{TEC}$. The method 200 then returns to step 205. If the average optical power $P_{OPT}$ does not increase (step 225), the temperature $\Delta T_{TEC}$ of the FP laser 54 is maintained and the method 200 returns to step 205.

In effect, the method 200 provides a means to align the wavelength of a FP laser 54 to the corresponding spectrally-sliced optical signal by a limited stepping of the wavelength of the FP laser 54 while looking for a maximum photocurrent $I_{BFM}$ from the back facet monitor 98.

Although the method 200 has been described using temperature as a control parameter for changing the wavelengths of the cavity modes of the FP laser 54, it should be recognized that other control variables can be employed to achieve a similar alignment of the wavelength of the dominant cavity mode to the wavelength spectrum of the spectral slice. For example, electrical, electro-optic or mechanical parameters can be used to shift the wavelengths of the FP laser cavity modes.

While the invention has been shown and described with reference to specific embodiments and examples, it should be understood by those skilled in the art that various changes in form and detail may be made therein without departing from the spirit and scope of the invention as recited in the accompanying claims.

What is claimed is:

1. A method for controlling the wavelength of a laser in a wavelength division multiplexed (WDM) system, the method comprising:
   generating broadband light having a dithered optical power and a wavelength spectrum that includes a plurality of WDM wavelengths;
   spectrally filtering the broadband light to generate a spectrally-sliced optical signal having a wavelength spectrum that includes one of the WDM wavelengths;
   injecting the spectrally-sliced optical signal into a laser;
   determining a dithered optical power of the laser; and
   controlling a parameter of the laser in response to the determination of the dithered optical power to thereby align a wavelength of the laser to the wavelength spectrum of the spectrally-sliced optical signal.

2. The method of claim 1 wherein the laser is a Fabry-Perot laser.

3. The method of claim 1 wherein the alignment comprises substantially aligning the wavelength of the laser to a peak in the wavelength spectrum of the spectrally-sliced optical signal.

4. The method of claim 1 wherein controlling a parameter comprises adjusting a temperature of the laser in response to the determination of the dithered optical power.

5. The method of claim 1 wherein controlling a parameter comprises adjusting an electrical parameter of the laser in response to the determination of the dithered optical power.

6. The method of claim 1 wherein controlling a parameter comprises adjusting a mechanical feature of the laser in response to the determination of the dithered optical power.

7. The method of claim 1 wherein a dither frequency of the dithered optical power is less than a bit rate of the laser.

8. The method of claim 1 wherein the dithered optical power is responsive to a pseudorandom bit sequence.

9. A wavelength division multiplexed (WDM) system comprising:
   a broadband light source to generate broadband light having a dithered optical power and a wavelength spectrum that includes a plurality of WDM wavelengths;
   a demultiplexer in optical communication with the broadband light source to generate a spectrally-sliced optical signal having a wavelength spectrum that includes a WDM wavelength;
   a laser in communication with the demultiplexer to receive the spectrally-sliced optical signal and to generate a WDM signal having a wavelength in the wavelength spectrum of the spectrally-sliced optical signal; and
   a control module in communication with the laser, the control module determining a dithered optical power of the laser and generating a control signal to adjust a parameter of the laser to thereby align the wavelength of the WDM signal to the wavelength spectrum of the spectrally-sliced optical signal.

10. The WDM system of claim 9 wherein the laser comprises a back facet monitor to generate a signal indicative of an optical power of the laser.

11. The WDM system of claim 10, wherein the control module comprises a dither detection module to receive the signal indicative of the optical power of the laser and to determine the dithered optical power therefrom.

12. The WDM system of claim 9 wherein the wavelength spectrum of the broadband light source is a continuous wavelength distribution.

13. The WDM system of claim 9 wherein the wavelength spectrum of the broadband light source is a wavelength comb.

14. A method for controlling the wavelength of a laser in a wavelength division multiplexed (WDM) system, the method comprising:
   spectrally filtering broadband light to generate a spectrally-sliced optical signal having a wavelength spectrum that includes a WDM wavelength;
   injecting the spectrally-sliced optical signal into a laser having a plurality of cavity modes, wherein each cavity mode corresponds to at least one wavelength;
   changing a value of a parameter of the laser from a first value to a second value to cause a change in the wavelength of at least one of the cavity modes of the laser;
   determining an average optical power of the laser at the second value of the parameter;
   maintaining the parameter at the second value if the determination of the average optical power indicates an increase, wherein maintaining the parameter at the second value reduces a difference between the wavelength of the at least one cavity mode and the wavelength spectrum of the spectrally-sliced optical signal; and
   changing the parameter back to the first value if the determination of the average optical power does not indicate an increase.

15. The method of claim 14 wherein the laser is a Fabry-Perot laser.

16. The method of claim 14, wherein said maintaining reduces the wavelength difference between the wavelength of the at least one cavity mode and a peak in the wavelength spectrum of the spectrally-sliced optical signal.

17. The method of claim 14 wherein the parameter is one of a temperature of the laser, an electrical parameter of the laser, or a mechanical parameter of the laser.

18. The method of claim 14 wherein the parameter is a cavity length of the laser.

19. A method for controlling a laser, comprising:
   spectrally filtering the light from a light source to generate an optical signal that includes at least one of a plurality of WDM wavelengths;
   injecting the optical signal into a laser;
   determining a dither in a signal corresponding to the laser; and
   controlling a parameter of the laser based on the dither determined in the signal corresponding to the laser, wherein the parameter is controlled to reduce a difference between a wavelength of light from the laser and said at least one of the WDM wavelengths in the optical signal.

20. The method of claim 19, further comprising:
   applying a dither signal to a light source that outputs light that includes a plurality of WDM wavelengths, the dither in the signal corresponding to the laser generated at least partially based on the dither signal applied to the light source.

21. The method of claim 19, wherein the signal corresponding to the laser is indicative of optical power of the laser and wherein said determining includes determining a dither in the optical power of the laser.

22. The method of claim 21, wherein said determining comprises:
   determining a dither in an amplitude of the optical power signal from the laser.

23. The method of claim 21, wherein said determining comprises:
   determining a dither in a frequency of the optical power signal from the laser.

24. The method of claim 19, wherein said controlling comprises:
reducing a difference between the wavelength of the laser and a peak in a wavelength spectrum of the optical signal.

25. The method of claim 19, wherein said controlling comprises: adjusting a temperature of the laser based on the dither in the signal corresponding to the laser.

26. The method of claim 19, wherein said controlling comprises:
adjusting an electrical parameter of the laser based on the dither in the signal corresponding to the laser.

27. The method of claim 19, wherein said controlling comprises:
adjusting a mechanical feature of the laser based on the dither in the signal corresponding to the laser.

28. The method of claim 19, wherein the dither is in a frequency of the signal corresponding to the laser and wherein the frequency dither is less than a bit rate of the laser.

29. The method of claim 19, wherein the signal corresponding to the laser is an electrical signal.

30. A control system comprising:
a light source to generate light having a plurality of WDM wavelengths;
a divider to output an optical signal from the light from the light source, the optical signal corresponding to at least one of the WDM wavelengths and to be input into a laser; and
a controller to determine a dither in a signal corresponding to the laser and to generate a control signal to reduce a difference between a wavelength of light from the laser and said at least one of the WDM wavelengths in the optical signal.

31. The system of claim 30, further comprising:
a dither injector to generate a dither signal, wherein the dither signal from the dither injector is applied to the light output from the light source and wherein the dither in the signal corresponding to the laser is generated at least partially based on the dither signal applied to the light source.

32. The system of claim 30, further comprising:
a monitor to generate the signal corresponding to the laser.

33. The system of claim 30, wherein the signal corresponding to the laser is indicative of optical power of the laser and wherein the controller determines a dither in the optical power of the laser.

34. The system of claim 33, wherein the controller determines the dither in an amplitude of the optical power signal from the laser.

35. The system of claim 33, wherein the controller determines a dither in a frequency of the optical power signal from the laser.

36. The system of claim 30, wherein the control signal reduces a difference between the wavelength of the laser and a peak in a wavelength spectrum of the optical signal.

37. The system of claim 30, wherein the control signal adjusts a temperature of the laser based on the dither in the signal corresponding to the laser.

38. The system of claim 30, wherein the control signal adjusts an electrical parameter of the laser based on the dither in the signal corresponding to the laser.

39. The system of claim 30, wherein the control signal adjusts a mechanical feature of the laser based on the dither in the signal corresponding to the laser.

40. The system of claim 30, wherein a dither in a frequency of the signal corresponding to the laser is less than a bit rate of the laser.

41. The system of claim 30, wherein the signal corresponding to the laser is an electrical signal.

* * * * *